US006601209B1

(12) United States Patent
Lewis et al.

(10) Patent No.: US 6,601,209 B1
(45) Date of Patent: Jul. 29, 2003

(54) SYSTEM AND METHOD FOR RELIABLE DATA TRANSMISSION OVER FADING INTERNET COMMUNICATION CHANNELS

(75) Inventors: Arianne M. Lewis, Chestnut Hill, MA (US); Evert Basch, Stow, MA (US); Allen H. Levesque, Chelmsford, MA (US); Arnold M. Michelson, Westwood, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/528,754

(22) Filed: Mar. 17, 2000

(51) Int. Cl.$^7$ ............................................... G06F 11/10
(52) U.S. Cl. ........................ 714/756; 714/782; 714/784
(58) Field of Search ............................... 714/756, 752, 714/782, 784, 701

(56) References Cited

U.S. PATENT DOCUMENTS 5,321,725 A * 6/1994 Paik et al. ..................... 375/39
6,216,250 B1 * 4/2001 Williams ..................... 714/799

OTHER PUBLICATIONS

A. M. Michelson, et al., "Reliable ATM Transmission in Tactical Networks", 2$^{nd}$ Annual FEDLAB Symposium Proceedings, Feb. 1998, pp. 246–250.

* cited by examiner

Primary Examiner—Phung M. Chung
(74) Attorney, Agent, or Firm—Leonard Charles Suchyta; James K. Weixel

(57) ABSTRACT

The present invention relates to a system and method for reliably transmitting Internet Protocol (IP) data packets over fading Internet communication channels. The invented system 10 comprises a transmitting device 12 having an interleaver circuit 22. The invented system 10 also includes a receiving device 14 having a de-interleaver circuit 38. The transmitting device 12 and the receiving device 14 communicate over a fading Internet communication channel 16. The transmitting device 12 applies error control coding to the IP packets before they are transmitted over the fading Internet communication channel 16. The Interleaver circuit 22 interleaves the IP data packets before transmitting them over the fading Internet channel 16. The receiving device 14 receives the interleaved IP packets from the fading Internet channel 16. The de-interleaver circuit 38 de-interleaves the received IP data packets. The receiving device 14 also uses the error control coding to detect and correct any errors incurred during transmission. The interleaving "spreads out" transmission errors over several IP packets and thus makes the error control and correction process more effective and efficient.

17 Claims, 2 Drawing Sheets

SYSTEM AND METHOD FOR RELIABLE DATA TRANSMISSION OVER FADING INTERNET COMMUNICATION CHANNELS

STATEMENT REGARDING FEDERALLY SPONSORED RESEARCH OR DEVELOPMENT

This invention was made with Government support under Federated Laboratory Program Cooperative Agreement DAAL 01-96-2-0002, sponsored by the U.S. Army Research Laboratory. The Government has certain rights in this invention.

TECHNICAL FIELD OF THE INVENTION

The present invention relates generally to the field of wireless electronic communications. In particular, the present invention pertains to a specialized communication technique that supports reliable transmission of compressed video (e.g. MPEG video) over fading Internet communication channels.

BACKGROUND

With the popularization of the Internet and the trend toward incorporating Internet access in wireless electronic devices, such as cellular phones and personal organizers, there has been an increased demand for efficient and reliable transmission of multimedia applications, including compressed video data, over the Internet. Internet Protocol (IP) is a known communication protocol that provides for the transmission of data over the Internet. IP data is transmitted over the Internet in "packets" wherein each "packet" consists of a header portion and a payload portion. The header portion conveys addressing information while the payload portion contains information bits that represent a segment of user data, such as MPEG video data. Unlike some other communication protocols, the payload portion of IP packets may be of any length.

The wireless Internet is an error-prone environment having low signal to noise ratios and experiencing bursts of errors and periods of fading. Unlike hard-wired communication channels, the wireless Internet is considered a "noisy" or "fading" communication channel that results in high levels of concentrated data transmission errors. To address these errors, various methods have been used. For example, the MPEG-4 standard, one of the most-recently developed video compression standards, supports a wide range of error resilience features that facilitate decoder recovery and error concealment in the event of a transmission error. However, these passive error control techniques do not actually correct channel errors, and the errors still affect the quality of the received video.

Another approach to addressing data errors that result from fading communication channels is to apply error control coding to the IP packets. These error control codes are combined with the headers and payloads of the IP packets before transmission over the wireless Internet and are used by a receiving device to monitor the integrity of the data received and to correct transmission errors in the data. To assure a low packet loss rate, a very powerful code is used for the header portion of each IP packet, and to minimize the overhead associated with error control codes and achieve adequate throughput, a somewhat weaker code is used for the payload portion of each IP packet.

IP transmission of compressed video poses different problems for quality of service as compared to transmission of voice, data, and imagery. To achieve a superior quality of service for MPEG transmissions, it is necessary to deliver a very small bit error rate (BER), on the order of $10^{-6}$ to $10^{-8}$, to the video decoder in the receiving device. This acceptable BER range is more stringent than that which is required for the effective transmission of voice, data, and imagery. If the delivered BER is larger than $10^{-6}$, the degradation in picture quality can result in picture flashes, jumps, jerkiness, or even the entire picture going blank for a period of time. The necessarily low BER has been an impediment to the effective and efficient transmission of MPEG video over severely noisy or fading Internet communication channels because such channels have very high inherent BERs and exhibit a mixture of independent and burst-error phenomena.

Ordinarily, to improve the performance of a coded communication system, the power of the error control codes is increased, thereby increasing the amount of coding overhead. While the additional overhead reduces the system throughput, the more powerful error control codes are better able to ensure the integrity of the data being transmitted. However, this approach is not sufficient in connection with severely fading wireless Internet communication channels. Even when very powerful error control codes are used, severely fading communication channels still result in receipt of excessive uncorrectable error patterns. In particular, the transmission errors incurred over a severely fading channel typically occur in bursts and tend to be very concentrated. Such errors are unacceptable when transmitting MPEG video because of the very low BER required to be delivered to the video decoder.

Accordingly, prior to this invention, the quality of MPEG video transmitted over fading wireless Internet communication channels was inferior. The present invention provides for a superior quality of service for MPEG video on fading Internet communication channels.

SUMMARY OF THE INVENTION

The present invention comprises a system and communication technique for IP transmission of compressed video (MPEG) that provides reliable data transmission over fading wireless Internet communication channels. The invented system includes a transmitting device and a receiving device that communicate with each other over the wireless Internet. The transmitting device includes a video encoder, an encapsulator circuit, a Bose-Chaudhuri-Hocquenghem (BCH) link coding circuit, a Reed-Solomon (RS) link coding circuit, an interleaver circuit, and a modulator. The receiving device includes a video decoder, a decapsulator circuit, a BCH link decoding circuit, an RS link decoding circuit, a de-interleaver circuit, and a demodulator. The transmitting device transmits MPEG video data using IP over the wireless Internet to the receiving device.

Prior to transmitting the MPEG data, the transmitting device applies binary BCH error control codes to the header portion of each IP packet and RS error control codes to the payload portion of each IP packet. Then, a predetermined number of IP packets are interleaved. The header portions of each IP packet in the group are interleaved on a bit-by-bit basis, and the payload portions of each IP packet in the group are interleaved on a byte-by-byte basis. The interleaved IP packets are transmitted over the wireless Internet to the receiving device. The receiving device de-interleaves the IP packets, detects and corrects transmission errors in the data, removes the binary BCH and RS error control codes and provides the error-corrected data to the video decoder to ultimately produce video on a display device. The technique of interleaving the IP packets prior to transmission and de-interleaving the IP packets after receipt essentially "spreads out" the transmission errors over many IP packets instead of allowing them to be concentrated in a few IP packets. The BCH and RS codes are more effective at detecting and correcting errors in IP packets if each packet contains a relatively small number of errors.

DETAILED DESCRIPTION OF A PREFERRED EMBODIMENT OF THE INVENTION

Figure 1:
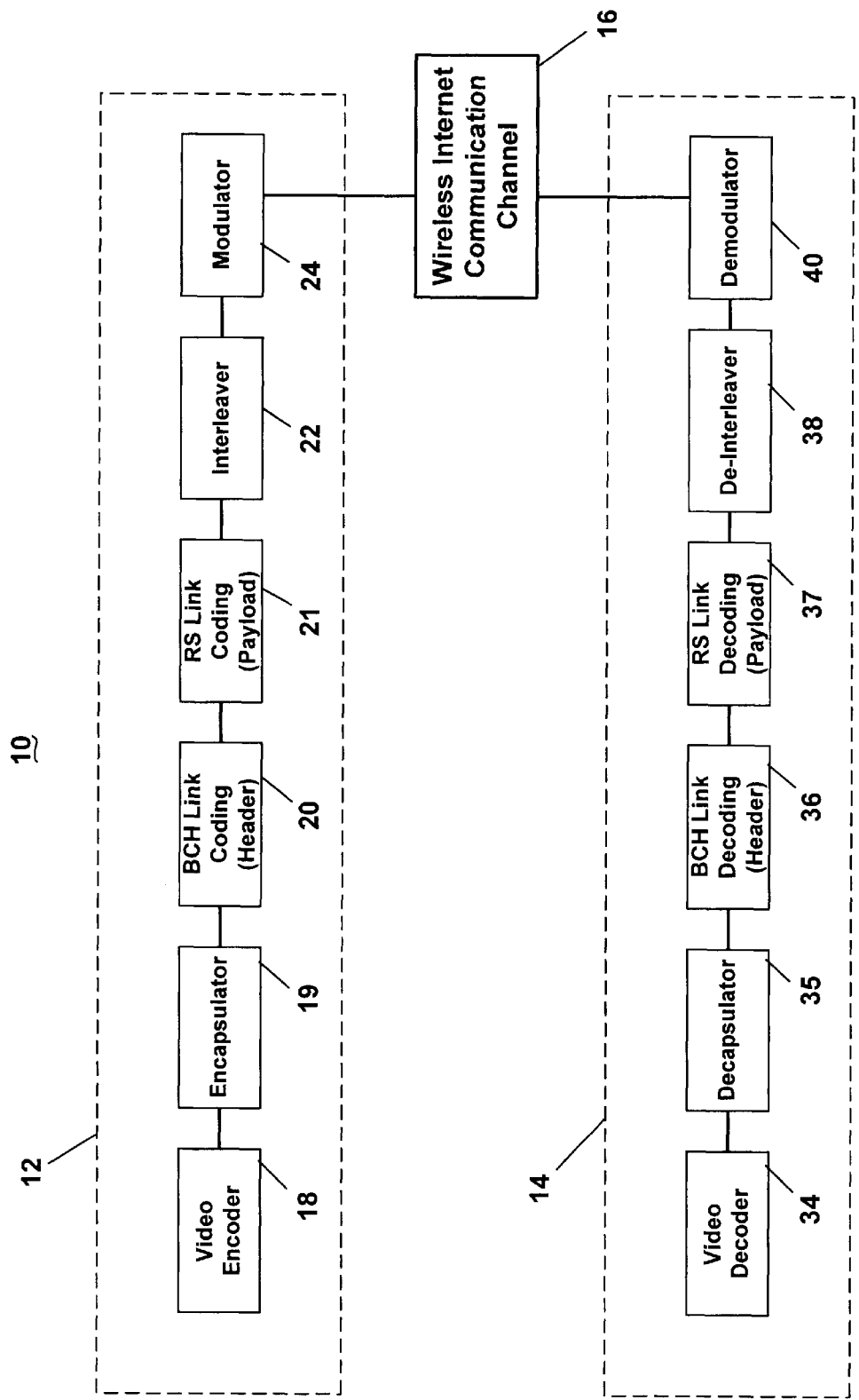
FIG. 1 is a block diagram of a preferred embodiment of the invented system.

Referring to FIG. 1, the inventive system 10 comprises a transmitting device 12 and a receiving device 14 in communication with each other via a communication channel 16 that experiences bursts of errors and periods of fading. Preferably, channel 16 comprises the wireless Internet. The transmitting device 12 comprises a video encoder circuit 18 in communication with an encapsulator circuit 19. The encapsulator circuit 19 transfers data to a Bose-Chaudhuri-Hocquenghem (BCH) link coding circuit 20, which in turn provides data to a Reed-Solomon (RS) link coding circuit 21. The RS link coding circuit 21 is connected to an interleaver circuit 22 that, in turn provides interleaved data to a modulator 24. The modulator 24 then transmits data over the communication channel 16 to the receiving device 14. The receiving device 14 comprises a video decoder circuit 34, a de-capsulator circuit 35, a BCH link decoding circuit 36, an RS link decoding circuit 37, a de-interleaver circuit 38, and a demodulator circuit 40. The demodulator 40 receives data from channel 16. The de-interleaver circuit 38 receives data from the demodulator 40 and transmits de-interleaved data to the RS link decoding circuit 37. The RS link decoding circuit 37 transmits data to the BCH link decoding circuit 36, and the BCH link decoding circuit 36 provides error-corrected data to the decapsulator circuit 35, which, in turn, provides data to the video decoder circuit 34.

Figure 2:
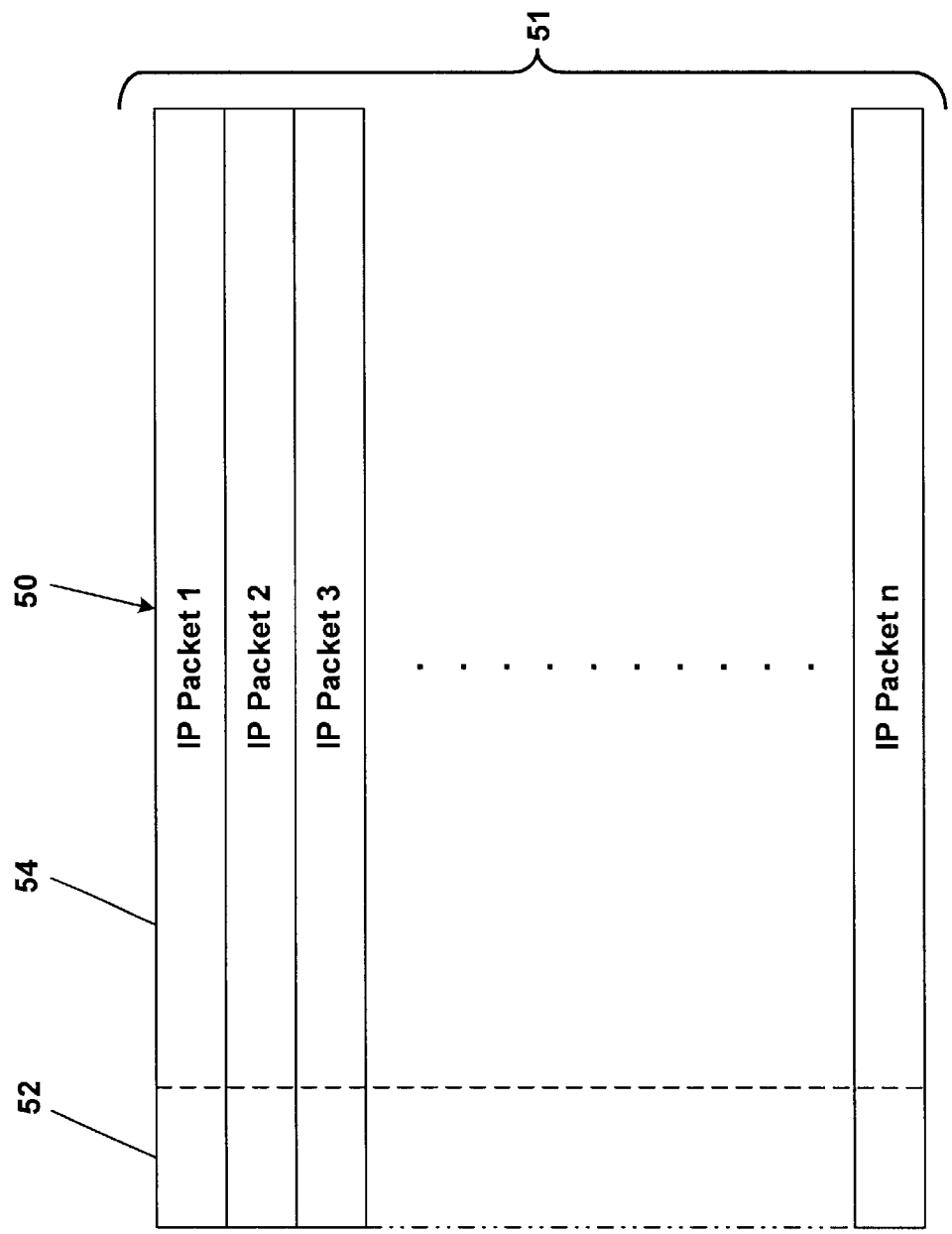
FIG. 2 shows an array of Internet Protocol data packets, as used in connection with a preferred embodiment of the invention.

In operation, the present invention utilizes the well-known IP protocol and data organization scheme to transfer MPEG video data across communication channel 16. According to a preferred embodiment of the present invention, and as shown in FIG. 2, the MPEG data is organized in IP data packets 50, each packet including a header portion 52 and a payload portion 54, as is well-known in the art. The video encoder 18 provides encoded MPEG data to the encapsulator circuit 19. The encapsulator circuit 19 encapsulates the MPEG data received from the video encoder 18 so that it adheres to the well-known IP data packet format and provides the IP data packets to the BCH link coding circuit 20. The BCH link coding circuit 20 is an error control coding circuit that applies a binary BCH code to the header portion of each of the IP data packets. The IP packets are then transferred to the RS link coding circuit 21, which applies an RS code to the payload portion of each of the IP data packets. Binary BCH codes and RS codes are both well-known infinite classes of cyclic block codes that are used to monitor the integrity of data as it is transferred from one device to another and to correct data errors that occur during transmission. Though it is preferred to use BCH and RS codes, it is acceptable to use other known error control codes with this invention.

After having BCH and RS codes applied to their respective header portions 52 and payload portions 54, a predetermined number (referred to herein as "n") of IP data packets 51 are read into the interleaver 22. The interleaver 22 reads the group of n IP packets 51 into rows of a rectangular interleave array, as shown in FIG. 2. Then the interleaver 22 reads the group of n IP packets 50 from the interleave array to the modulator 24 column by column. The header portions of the IP packets are read to the modulator 23 bit-by-bit, and the payload portions of the IP packets are read to the modulator 23 byte-by-byte. Specifically, the first bit of the header portion of the first IP packet is read out to the modulator 24 first. The first bit of the header portion of the second IP packet is read out second. The first bit of the header portion of the third IP packet is read out third, and so on until the first bit of the header portion of the $n^{th}$ IP packet in the group is read out to the modulator 24. Then, the second bit of the header portion of the first IP packet is read to the modulator 24, followed by the second bit of the header portion of the second IP packet. Then the second bit of the header portion of the third IP packet, and so on until the second bit of the header portion of the $n^{th}$ IP packet in the group is read out. This interleaving methodology is continued column-by-column until the last bit of the header portion of the $n^{th}$ IP packet is read out from the interleave array to the modulator 24. At this point, all of the IP packet headers in the group have been read out to the modulator 24 on a bit-by-bit, column-by-column basis.

Then, the IP packet payloads in the group are read out byte-by-byte from the interleave array to the modulator 24. Specifically, the first byte of the payload portion of the first IP packet is read out to the modulator 24, followed by the first byte of the payload portion of the second IP packet, followed by the first byte of the payload portion of the third IP packet, and so on until the first byte of the payload portion of the $n^{th}$ IP packet is read out to the modulator 24. Then, the second byte of the payload portion of the first IP packet is read out to the modulator 24, followed by the second byte of the payload portion of the second IP packet, followed by the second byte of the payload portion of the third IP packet, and so on. This interleaving methodology is continued column-by-column until the last byte of the payload portion of the $n^{th}$ IP packet is read out to the modulator 24. At this point, the header portions of the IP packets in the group have been fully bit-by-bit interleaved, and the payload portions of the IP packets in the group have been fully byte-by-byte interleaved.

As the modulator 24 receives the interleaved data from the interleaver 22, the modulator 24 converts the interleaved digital data to analog data that is capable of being transmitted over wireless Internet communication channels, as is well-known in the art. The modulator 24 then transfers the interleaved and modulated data to communication channel 16.

The interleaved data is transmitted across the communication channel 16 and then received by the demodulator 40 of the receiving device 14. The demodulator 40 converts the analog IP packets received over the wireless Internet communication channel 16 back to digital format, as is well-known in the art. The demodulator 40 then transfers the digital interleaved data to the de-interleaver 38.

The de-interleaver 38 performs the opposite function of the interleaver 22 and returns the received data to a de-interleaved format. Specifically, the de-interleaver 38 stores the first received bit as the first bit of the header portion of the first IP packet in a de-interleave array. The de-interleaver 38 stores the second received bit as the first bit of the header portion of the second IP packet. The de-interleaver stores the third received data bit as the first bit of the header portion of the third IP packet, and so on. After the first bit of the header portions of each of the IP packets in the group are read and stored, the de-interleaver 38 stores the next received data bit as the second bit of the header portion of the first IP packet. The next received data bit is stored as the second bit of the header portion of the second IP packet and the following data bit is stored as the second bit of the header portion of the third IP packet, and so on. This de-interleaving methodology is repeated column-by-column until the last bit of the header portion of the $n^{th}$ IP packet is read and stored in the de-interleave array. At this point, all of the header portions of the IP packets in the group have been de-interleaved, and they are stored in a de-interleaved array.

Then, the IP packet payloads are read into the de-interleave array byte-by-byte. The de-interleaver 38 stores the next byte of data received from the demodulator 40 as the first byte of the payload portion of the first IP packet. The next byte of received data is stored as the first byte of the payload portion of the second IP packet. The next byte of received data is stored as the first byte of the payload portion of the third IP packet, and so on until the first byte of the payload portion of the $n^{th}$ IP packet has been stored. Then, the next byte of received data is stored as the second byte of the payload portion of the first IP packet. The next byte of received data is stored as the second byte of the payload portion of the second IP packet. The next byte of received data is stored as the second byte of the payload portion of the third IP packet, and so on until the last byte of the payload portion of the $n^{th}$ IP packet is stored. At this point, all of the IP packets of the group transmitted over the wireless Internet communication channel have been received and de-interleaved.

The specific method of interleaving and de-interleaving described hereinabove is a preferred methodology. However, other methods of interleaving are contemplated by this invention and acceptable to carry out the purpose of reorganizing the data bits in an orderly fashion prior to transmission so that when the data bits are received and returned to their original format, any transmission error-bursts will be spread out across several IP packets.

The de-interleaver 38 transfers the data to RS link decoding circuit 37. The RS link decoding circuit is an error control decoding circuit that uses the RS codes applied to the payload portion of the IP packets to detect and correct any data errors that occurred in the payload portions during transmission. The RS link decoding circuit also removes the RS codes from the payload portions of the IP packets. Then, the data is transferred to the BCH link decoding circuit 36. The BCH link decoding circuit 36 uses the BCH codes to detect and correct data errors in the header portions of the IP packets that occurred during transmission. The BCH link decoding circuit 36 also removes the BCH codes from the header portion of the IP packets. At this point, all RS and BCH error codes have been removed, and the remaining data consists entirely of error-corrected header and payload portions of the MPEG video data. The error-corrected IP packets are provided to the decapsulator 35, which extracts the payload portion (i.e., the IP data) of the IP packets, as is well-known in the art. Then the error-corrected MPEG data (from the payload) is transferred to the video decoder 34, which decodes the data to create images on a display unit (not shown), as is well-known in the art.

The use of the interleaving and de-interleaving technique in combination with applying BCH and RS error codes to the IP packets effectively "spreads out" the transmission errors resulting from the fading wireless Internet communication channel so that only a few errors appear in each packet. Specifically, a transmission error burst resulting from a severely fading communication channel may adversely affect many consecutive data bits as they are transferred over the communication channel 16. Because the IP packets are interleaved before being transmitted over the communication channel 16, consecutive data bit errors actually affect only one or a few bits of a large number of IP packets instead of affecting many bits of the same IP packet. This situation is better than having many errors in some packets and very few or no errors in other packets because IP packets having many errors are typically uncorrectable. By spreading the errors out over many packets, the BCH and RS codes are more effective in detecting and correcting such errors. This is particularly important for the transmission of MPEG video over the wireless Internet.

In the disclosed invention, the interleaving depth, or the number of IP packets that make up each interleaving group, affects the performance of the system. Generally, for the same channel conditions, the greater the interleaving depth, the smaller the BER delivered to the video decoder 34 and the longer time period between severe error events. It has been found that a small amount of interleaving results in a drastic improvement in video quality. Assuming a 3 Hz fading rate and a 2 MB/sec data transfer rate, it has been found that interleaving groups of 1,500 IP packets at a time eliminates constant screen blanking, as is the case when no interleaving is performed. Nevertheless, severe disturbances still occur at this level of interleaving. Interleaving depths between 10,000 and 15,000 packets result in only two to three severe disturbances in video quality spaced four to five minutes apart. This type of quality may be acceptable for some video applications. Interleaving depths greater than 15,000 would result in even fewer and more disbursed severe error events. It has been found that for a communication channel having an inherent BER of $10^{-3}$ with slow Rician fading and K=10 (K is a well-known fading ratio parameter that represents the relative severity of fading in the communication channel), the optimum interleaving depth is 20,000.

While a preferred embodiment of the present invention has been described herein, it is apparent that the basic construction can be altered to provide other embodiments which utilize the processes and compositions of this invention. Therefore, it will be appreciated that the scope of this invention is to be defined by the claims appended hereto rather than by the specific embodiment which has been presented hereinbefore by way of example.

What is claimed is:

1. An electronic communication system, comprising:
   a transmitting device having an error control coding circuit and an interleaver circuit in communication with each other;
   a receiving device having an error control decoding circuit and a de-interleaver circuit in communication with each other; and
   a fading communication channel over which said transmitting device transmits Internet Protocol (IP) data packets to said receiving device;
   wherein said interleaver circuit interleaves the IP data packets on more than one format basis.

2. The electronic system of claim 1, wherein said fading communication channel comprises the wireless Internet.

3. The electronic system of claim 1, wherein said error control coding circuit applies a Bose-Chaudhuri-Hoequenghem (BCH) code to said IP data packets before they are transmitted across said communication channel.

4. The electronic system of claim 2, wherein said error control coding circuit further applies a Reed-Solomon (RS) code to said IP data packets before they are transmitted across said communication channel.

5. The electronic system of claim 1, wherein said IP data packets comprise compressed video data.

6. The electronic system of claim 1 wherein said format bases are selected to assure a low packet loss rate while maintaining an adequate throughput, a first format comprising a first code and a second format comprising a second code, said second code being weaker than said first code.

7. The electronic system of claim 6, wherein each of said IP data packets comprises a first portion employing said first code and a second portion employing said second code, and said interleaver circuit interleaves said first portions of said data packets on a bit-by-bit basis and interleaves said second portions of said data packets on a byte-by-byte basis.

8. The electronic system of claim 7, wherein said error control coding circuit applies a Bose-Chaudhuri-Hocquenghem (BCH) code to said IP data packets before they are transmitted across said communication channel.

9. The electronic system of claim 8, wherein said error control coding circuit further applies a Reed-Solomon (RS) code to said IP data packets before they are transmitted across said communication channel.

10. An electronic communication system for transmitting and receiving IP data packets using Internet Protocol (IP) over a fading Internet communication channel, comprising:
   an error control coding circuit for applying error control codes to the IP data packets;
   an interleaver circuit in communication with said error control coding circuit for interleaving the IP data packets before the IP data packets are transmitted to the Internet communication channel wherein said interleaver circuit interleaves the IP data packets on more than one format basis;
   a de-interleaver circuit in communication with the Internet communication channel for de-interleaving the IP data packets after the IP data packets are received from the Internet communication channel; and
   an error control decoding circuit in communication with said de-interleaver circuit for removing said error codes from the IP data packets.

11. The electronic communication system of claim 10, wherein said error control coding circuit comprises a Bose-Chaudhuri-Hocquenghem (BCH) link coding circuit that applies BCH codes to the IP data packets and a Reed-Solomon (RS) link coding circuit that applies RS codes to the IP data packets.

12. The electronic system of claim 11, wherein each of the IP data packets comprises a first portion and a second portion, and said interleaver circuit interleaves said first portions of the IP data packets on a bit-by-bit basis and interleaves said second portions of the data packets on a byte-by-byte basis.

13. The electronic system of claim 10, wherein each of the IP data packets comprises a first portion and a second portion, and said interleaver circuit interleaves said first portions of the data packets on a bit-by-bit basis and interleaves said second portions of the data packets on a byte-by-byte basis.

14. A method for transmitting Internet Protocol (IP) data packets over a fading Internet communication channel, comprising the steps:
   applying error control codes to the IP data packets;
   interleaving the IP data packets on more than one format basis;
   transmitting the IP data packets across the fading Internet communication channel;
   de-interleaving the IP data packets; and
   detecting and correcting errors incurred during transmission of the IP data packets over the fading Internet communication channel.

15. The method of claim 14, wherein said step of applying an error control code to the IP data packets comprises applying a Bose-Chauduri-Hocquenghem (BCH) error control code and applying a Reed-Solomon (RS) error control code.

16. The method of claim 15, wherein each of the IP data packets comprises a first portion and a second portion, and wherein said step of interleaving the IP data packets comprises interleaving said first portions on a bit-by-bit basis and interleaving said second portions on a byte-by-byte basis.

17. The method of claim 14, wherein each of the IP data packets comprises a first portion and a second portion, and wherein said step of interleaving the IP data packets comprises interleaving said first portions on a bit-by-bit basis and interleaving said second portions on a byte-by-byte basis.

* * * * *